United States Patent
Everson et al.

(10) Patent No.: US 10,458,793 B2
(45) Date of Patent: Oct. 29, 2019

(54) MEASURING CAMERA TO BODY ALIGNMENT FOR AN IMAGER MOUNTED WITHIN A STRUCTURAL BODY

(71) Applicant: U.S. Army Research Laboratory ATTN: RDRL-LOC-I, Adelphi, MD (US)

(72) Inventors: Daniel P. Everson, Baldwin, MD (US); James M. Maley, Abingdon, MD (US)

(73) Assignee: America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/873,036

(22) Filed: Jan. 17, 2018

(65) Prior Publication Data

US 2019/0219392 A1    Jul. 18, 2019

(51) Int. Cl.
| | |
|---|---|
| *G01C 11/02* | (2006.01) |
| *G01B 11/27* | (2006.01) |
| *H04N 13/246* | (2018.01) |
| *G01B 5/00* | (2006.01) |
| *G02B 7/00* | (2006.01) |
| *G01C 21/20* | (2006.01) |
| *G01C 1/00* | (2006.01) |
| *G06T 7/80* | (2017.01) |

(52) U.S. Cl.
CPC ............ *G01C 11/02* (2013.01); *G01B 5/0025* (2013.01); *G01B 11/27* (2013.01); *G01C 1/00* (2013.01); *G01C 21/20* (2013.01); *G02B 7/003* (2013.01); *G06T 7/85* (2017.01); *H04N 13/246* (2018.05)

(58) Field of Classification Search
CPC ....... H04N 13/246; G01C 11/02; G01B 11/27
See application file for complete search history.

(56) References Cited

U.S. PATENT DOCUMENTS

| | | | | |
|---|---|---|---|---|
| 6,121,999 A * | 9/2000 | Schaack | ............. | A61B 1/00147 348/135 |
| 6,965,397 B1 * | 11/2005 | Honey | ................... | H04N 5/222 33/318 |
| 8,320,709 B2 * | 11/2012 | Aratani | ................ | G06K 9/3216 345/633 |
| 8,619,144 B1 * | 12/2013 | Chang | ....................... | G06T 7/80 348/180 |
| 2003/0103651 A1 * | 6/2003 | Novak | ................... | G01C 11/02 382/106 |

(Continued)

*Primary Examiner* — Jamie J Atala
*Assistant Examiner* — Michael Robert Cammarata
(74) *Attorney, Agent, or Firm* — Alan I. Kalb

(57) ABSTRACT

A technique is provided to measure an alignment of an imaging device of a guided projectile containing an imager and a world coordinate frame, and includes producing a pure rolling motion of a body of the projectile, capturing a series of images of an imaging device calibration target over a range of body roll angles of the rolling body, measuring the roll angles of the rolling body with respect to a world coordinate frame as defined by the imaging device calibration target, simultaneously estimating alignment angles of the imaging device and misalignment angles associated with an orientation of the body, and estimating a rotational transform between an imaging device coordinate frame and a body coordinate frame based on the estimated alignment angles and misalignment angles.

3 Claims, 7 Drawing Sheets

(56) References Cited

U.S. PATENT DOCUMENTS

| | | | |
|---|---|---|---|
| 2006/0152589 A1* | 7/2006 | Morrison | G06K 9/209 |
| | | | 348/208.1 |
| 2016/0005164 A1* | 1/2016 | Roumeliotis | G01C 21/165 |
| | | | 348/116 |
| 2016/0225191 A1* | 8/2016 | Mullins | G06F 3/013 |
| 2017/0277197 A1* | 9/2017 | Liao | G05D 1/0253 |
| 2017/0280135 A1* | 9/2017 | Shroff | G06T 7/80 |
| 2017/0287166 A1* | 10/2017 | Claveau | G06T 7/80 |
| 2018/0238682 A1* | 8/2018 | D'Agostino | G01B 11/2755 |
| 2019/0015988 A1* | 1/2019 | Inazumi | B25J 9/1692 |

\* cited by examiner

MEASURING CAMERA TO BODY ALIGNMENT FOR AN IMAGER MOUNTED WITHIN A STRUCTURAL BODY

GOVERNMENT INTEREST

The embodiments described herein may be manufactured, used, and/or licensed by or for the United States Government without the payment of royalties thereon.

BACKGROUND

Technical Field

The embodiments herein generally relate to navigation systems, and more particularly to navigation systems using images to estimate positions and orientations of a structural body or vehicle.

Description of the Related Art

Vision based navigation systems utilize information from a digital imaging system to estimate navigation states of a vehicle. A camera intrinsics model developed through calibration of an imager describes the projective transformation from the observed world scene into the camera coordinate frame. This transformation allows for pixel locations identified by computer vision algorithms to be used in estimating navigation states. However, this process relates the world scene to the camera coordinate frame and an additional transformation is needed to provide estimates in the vehicle's body coordinate frame as is necessary in order to be useful for vehicle guidance. Accordingly, measurement of the rotation transform between the camera coordinate frame and the body coordinate frame is a necessary element of implementing a vision based navigation system.

The conventional solutions generally require direct measurement of the orientation of the body and the reference objects in the Earth/world coordinate frame using precision instruments, sensing the motion of the body with respect to a stationary set of reference objects, or measuring the relative orientation of the body with respect to the world coordinate frame using precision alignment devices. However, these approaches are generally costly and/or imprecise.

SUMMARY

In view of the foregoing, an embodiment herein provides a method for measuring an alignment of an imaging device, the method comprising producing a pure rolling motion of a body; capturing a series of images of an imaging device calibration target over a range of body roll angles of the rolling body; measuring the roll angles of the rolling body with respect to a world coordinate frame as defined by the imaging device calibration target; simultaneously estimating alignment angles of the imaging device and misalignment angles associated with an orientation of the body; and estimating a rotational transform between an imaging device coordinate frame and a body coordinate frame based on the estimated alignment angles and misalignment angles. The alignment angles may comprise three rotation angles representing a transform between the body coordinate frame and the imaging device coordinate frame, and wherein the misalignment angles may comprise two rotation angles representing a transform between a roll axis of the body and the world coordinate frame. The body may comprise a cylindrical body. The producing of the pure rolling motion of the body may occur by a pair of support mechanisms that mechanically constrain the body to produce the pure rolling motion. The support mechanisms may comprise v-block mechanisms. The method may comprise using an imaging device extrinsics estimate to define a world-to-camera coordinate frame rotation for each image in the series of images. The method may comprise using a numerical optimization process to estimate the alignment angles of the imaging device and misalignment angles associated with an orientation of the body. The body may comprise a guided projectile.

Another embodiment provides a system for measuring an alignment of an imager, the system comprising a pair of support mechanisms to produce a pure rolling motion of a body; an imager rigidly affixed to the body to capture a series of images of an imager calibration target over a range of body roll angles of the rolling body; a sensor to measure the roll angles of the rolling body with respect to a world coordinate frame as defined by the imager calibration target; and a processor to simultaneously estimate alignment angles of the imager and misalignment angles associated with an orientation of the body; and estimate a rotational transform between an imager coordinate frame and a body coordinate frame based on the estimated alignment angles and misalignment angles, wherein the alignment angles comprise three rotation angles representing a transform between the body coordinate frame and the imager coordinate frame, and wherein the misalignment angles comprise two rotation angles representing a transform between a roll axis of the body and the world coordinate frame. The imager calibration target may comprise a checkerboard camera calibration target. The sensor may comprise any of an inclinometer and an inertial measurement unit device. The processor may use an imager extrinsics estimate to define a world-to-camera coordinate frame rotation for each image in the series of images. The processor may use a numerical optimization process to estimate the alignment angles of the imager and misalignment angles associated with an orientation of the body. The body may comprise a guided projectile containing the imager.

Another embodiment provides a non-transitory computer readable medium comprising instructions that when executed cause a processor of a computing device to detect a pure rolling motion of a body; process a series of images of an imaging device calibration target over a range of body roll angles of the rolling body; measure the roll angles of the rolling body with respect to a world coordinate frame as defined by the imaging device calibration target simultaneously estimate alignment angles of the imaging device and misalignment angles associated with an orientation of the body; and estimate a rotational transform between an imaging device coordinate frame and a body coordinate frame based on the estimated alignment angles and misalignment angles. The alignment angles may comprise three rotation angles representing a transform between the body coordinate frame and the imaging device coordinate frame. The misalignment angles may comprise two rotation angles representing a transform between a roll axis of the body and the world coordinate frame. The imaging device calibration target may comprise a checkerboard camera calibration target. The processor may use an imaging device extrinsics estimate to define a world-to-camera coordinate frame rotation for each image in the series of images. The processor may use a numerical optimization process to estimate the alignment angles of the imaging device and misalignment angles associated with an orientation of the body.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
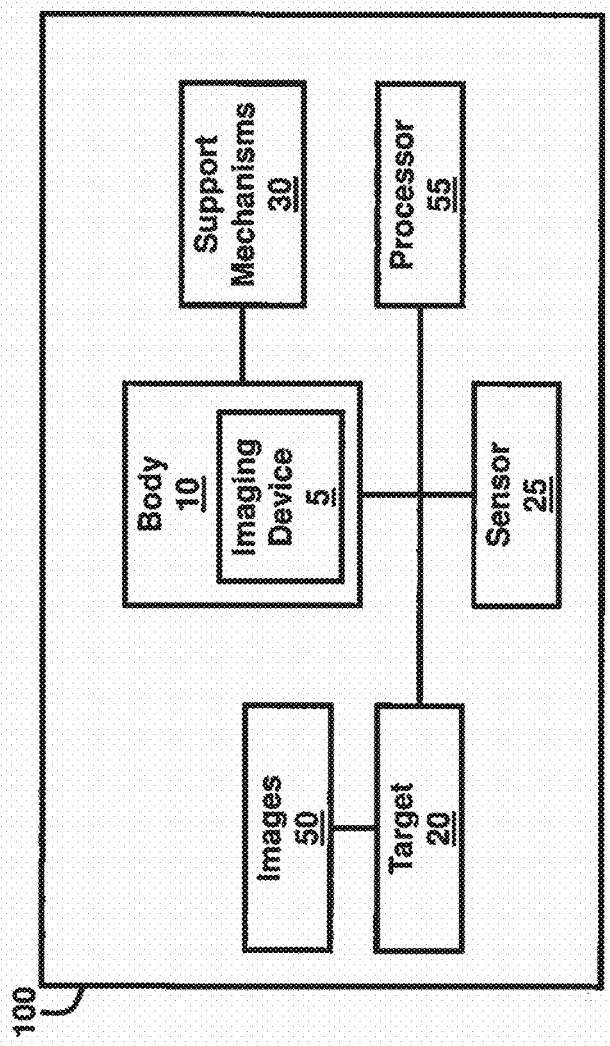
FIG. 1 is a block diagram illustrating a system, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method for measuring the camera to body rotational transformation for an imager mounted within a cylindrical body as would typically be found for an imager mounted on the nose of a projectile. The method is able to measure the transform and eliminates the need for a precise geometrical configuration of measurement hardware and does not rely on lasers or other expensive alignment devices. The embodiments herein may be used to identify the camera-to-body rotational transform that is necessary to convert computer vision results such as navigation states from the camera coordinate frame to the body coordinate frame. Referring now to the drawings, and more particularly to FIGS. 1 through 7, there are shown exemplary embodiments.

FIG. 1 is a block diagram of a system 100 for measuring an alignment of an imaging device 5. The imaging device 5 may comprise a camera, smartphone, computing device, or any other electronic device configured to take and/or process images and or video. For the purposes of the descriptions herein, the terms imaging device, imager, and camera are used interchangeably, without implication of any specific type of imaging device. In an example, the system 100 comprises support mechanisms 30 to produce a pure rolling motion of a body 10. In an example, the support mechanisms 30 may comprise v-block support mechanisms 30. However, the support mechanisms 30 may include any suitable structure for mechanically constraining the body 10 to produce a pure rolling motion (i.e., all of the points of the body 10 which lie on the longitudinal axis of the body 10 are stationary as the body 10 rotates about this axis), and the v-block configuration, while described as an exemplary embodiment, is not restrictive, and other configurations and types of support mechanisms 30 may be used in accordance with the embodiments herein. Furthermore, the body 10 may be a structural body and configured in any suitable shape including, without limitation, cylindrical, conical, elongated, among other shapes and configurations capable of having a pure rolling motion. In an example, the body 10 may comprise a guided projectile containing the imaging device 5. The imaging device 5, which may be rigidly affixed to the body 10, captures a series of images 50 of an imaging device calibration target 20 over a range of body roll angles of the rolling body 10. A sensor 25 is used to measure the roll angles of the rolling body 10 with respect to a world coordinate frame as defined by the imaging device calibration target 20. The system 100 also includes a processor 55 to simultaneously measure alignment angles $\varphi_C$, $\theta_C$, $\phi_C$ of the imaging, device 5 and misalignment angles $\varphi_{VB}$, $\theta_{VB}$ associated with the alignment of the roll axis of the body 10, wherein the alignment angles $\varphi_C$, $\theta_C$, $\phi_C$ comprise three rotation angles representing a transform between the body coordinate frame and the imaging device coordinate frame, and wherein the misalignment angles $\varphi_{VB}$, $\theta_{VB}$ comprise two rotation angles representing a transform between the roll axis of the body 10 and the world coordinate frame as constrained by the orientation of the support mechanisms 30. The processor 55 also estimates a rotational transform between an imaging device coordinate frame and a body coordinate frame. The imaging device calibration target 20 may comprise a checkerboard camera calibration target, according to one example. There are also other possible types of calibration targets, which may be used in accordance with the embodiments herein. The sensor 25 may comprise any of an inclinometer and an inertial measurement unit device. The processor 55 is to use an imaging device extrinsics estimate to define a world-to-camera coordinate frame rotation for each image in the series of images 50. The processor 55 is to use a numerical optimization process to estimate the alignment angles $\varphi_C$, $\theta_C$, $\phi_C$ and the misalignment angles $\varphi_{VB}$, $\theta_{VB}$.

Figure 2:
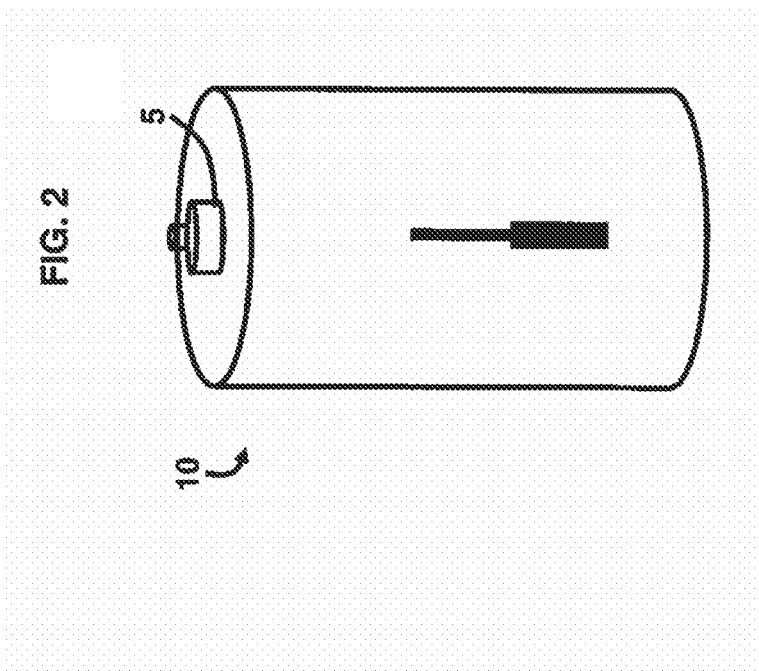
FIG. 2 is a schematic diagram of a structural body, according to an embodiment herein.
Figure 3:
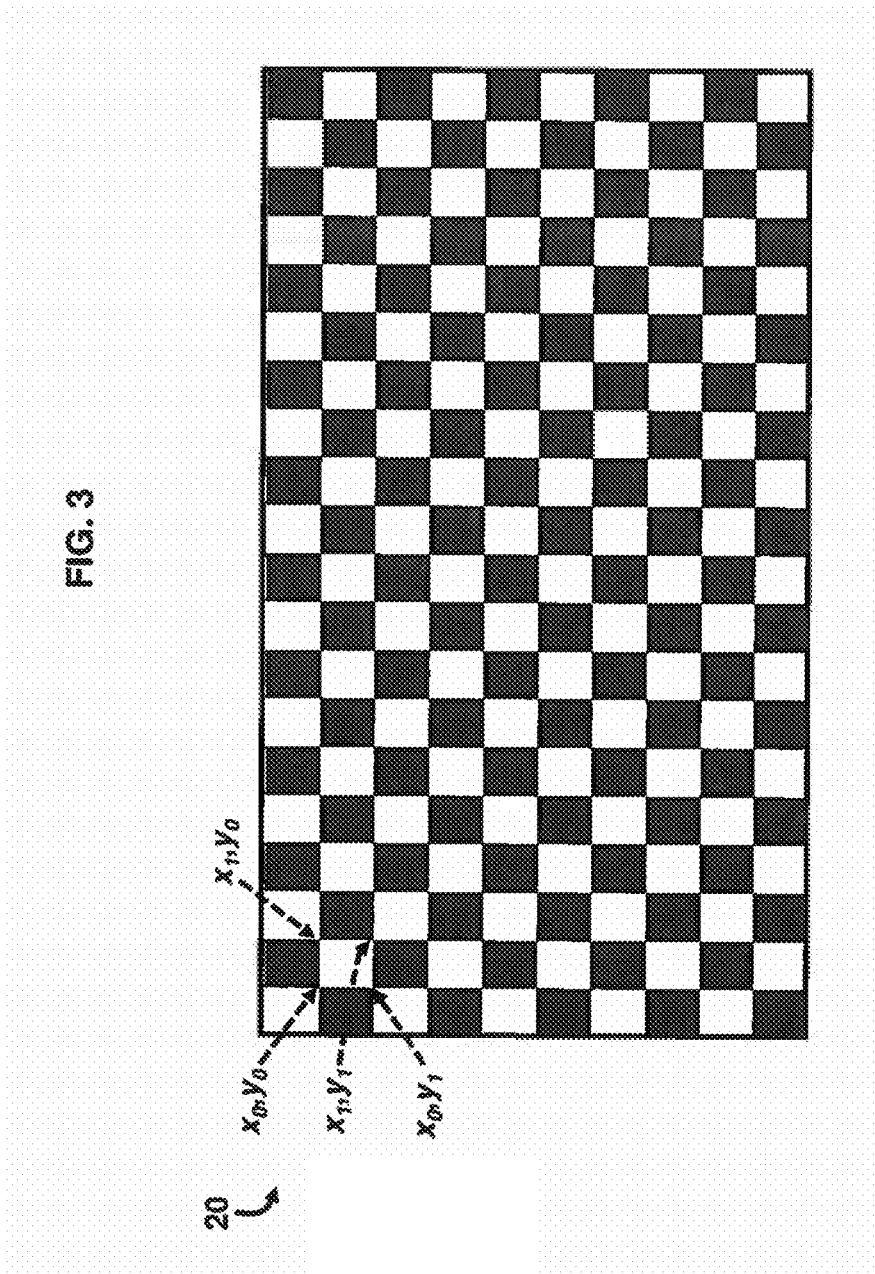
FIG. 3 is a schematic diagram of a calibration target, according to an embodiment herein.

The embodiments herein utilize a previously-generated pinhole camera model and lens distortion model to describe the projective transformation between the world coordinate frame and the camera coordinate frame of the imager (e.g., imaging device 5) installed within a body 10, such as shown in FIG. 2, with reference to FIG. 1. In an example, the body 10 may be approximately 83 mm, although other configurations are possible in accordance with the embodiments herein. These models are generated using a planar checkerboard camera calibration technique, according to an example, which relies on multiple images of a planar calibration target 20, such as shown in FIG. 3, with reference to FIGS. 1 and 2, to identify world coordinate frame data points located at the corner points ($x_0,y_0$; $x_0,y_1$; $x_1,y_0$; $x_1,y_1$) of each block of the calibration target 20. Accordingly, as used herein, "corner points" refers to all of the intersections of the black and white squares on the calibration target 20, and in the example of FIG. 3, there are 171 such corner points, with only one set labeled for illustration purposes. Other configurations of the calibration target 20 may render any number of corner points, which may be used in accordance with the embodiments herein. The processor 55 that estimates the extrinsics for each image uses many corner points (for example, >50) to estimate (via numerical optimization) the position and orientation of the imaging device 5 with respect to the calibration target 20. These world points are then used to perform a numerical optimization that estimates the parameters of the camera pinhole model and lens distortion model.

The camera model obtained through camera calibration may be used to estimate the position and orientation of the imager (camera extrinsics) for a given image with respect to the world coordinate frame defined by the position and orientation of the planar calibration target 20. If the orientation of the body 10 with respect to the calibration target 20 is also known over a series of images this information can be used to determine the rotational transformation between the camera coordinate frame and the body coordinate frame. However, it is a difficult process to accurately measure the orientation of the body 10 with respect to the calibration target 20. To do so would typically require the use of precision staging and mechanical or optical alignment devices such as lasers or theodolites. The method for measuring the camera to body rotational transformation provided by the embodiments herein estimates the camera to body rotational transformation without the need for these devices.

Figure 4:
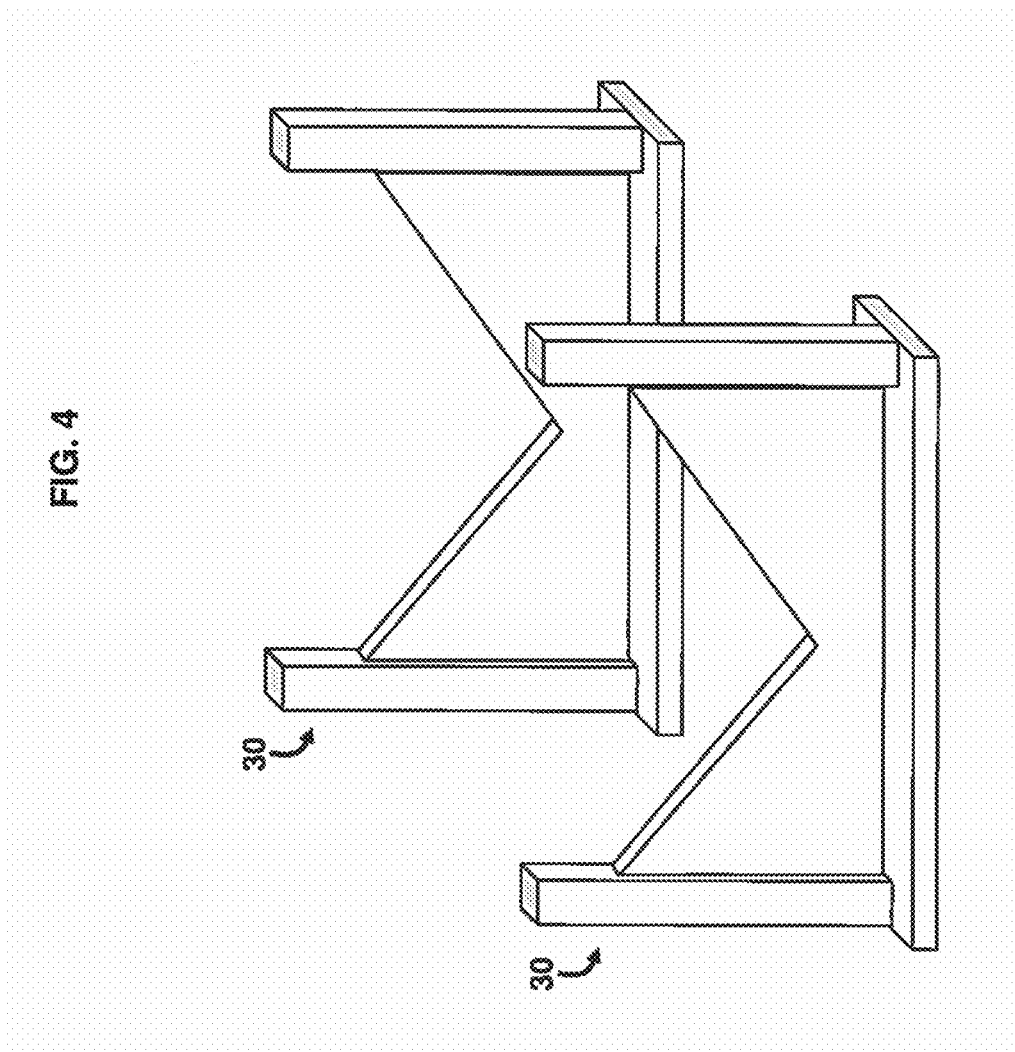
FIG. 4 is a schematic diagram of v-block mechanisms, according to an embodiment herein.
Figure 5:
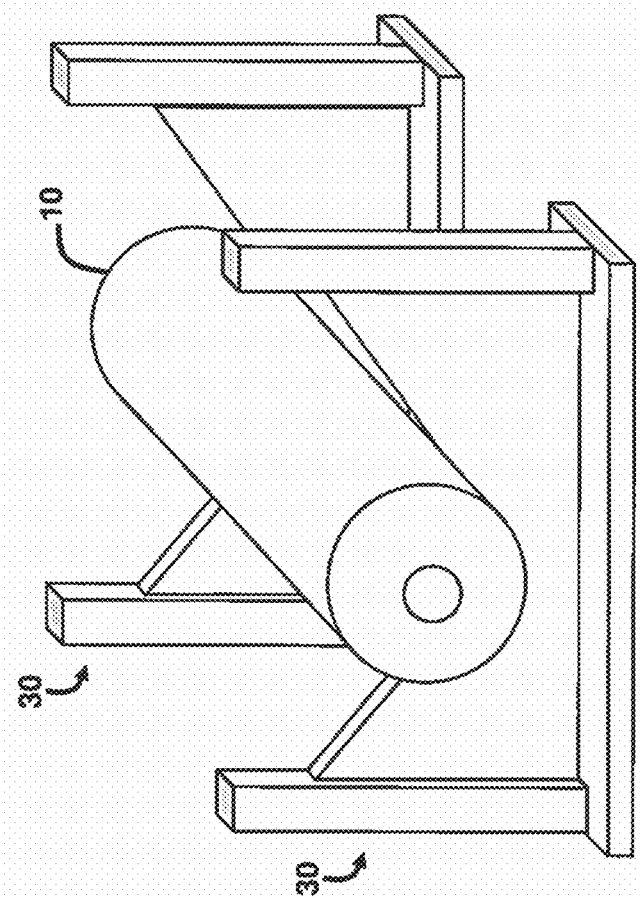
FIG. 5 is a schematic diagram of a structural body set in v-block mechanisms, according to an embodiment herein.

As mentioned, the support mechanisms 30 may be configured as v-blocks, as shown in FIG. 4, with reference to FIGS. 1 through 3, may be used in accordance with the method described below. Because the body 10 within which the imager (e.g., imaging device 5) is mounted is cylindrical in one example, v-block support mechanisms 30, as shown in FIG. 5, with reference to FIGS. 1 through 4, may be used to provide a mechanism to easily generate a pure rolling motion of the body 10. The method provided by the embodiments herein uses the pure rolling motion provided by the support mechanisms 30 to extract the body to camera rotation transformation while requiring only limited additional physical constraints on the calibration setup such that the roll angle of the body at the point each image in the series of images 50 is measured with respect to the world frame as defined by the orientation of the calibration target 20. Preferably, the calibration target coordinate system x-axis is leveled; i.e. set perpendicular to the Earth's gravity vector. This may be achieved using a precise bubble level or digital inclinometer. Additionally, the roll angle of the body 10 with respect to the Earth's gravity vector should be measured for each image that is collected. This may be achieved with a center finding inclinometer, digital inclinometer, or a digital IMU installed within the body 10. Neither of these constraints necessitate the use of expensive mechanical or optical alignment devices.

According to the embodiments herein, a series of images of a calibration target 20 is captured over a range of body roll angles. The previously calculated camera intrinsics and distortion models are used to estimate the camera position and orientation (camera extrinsics) with respect to the world coordinate frame as defined by the calibration target 20 for each image in the series. Using the camera pose for each image, non-linear least squares numerical optimization is used to solve for the three rotation angles that represent the transform between the body coordinate frame and the camera coordinate frame as well as the two rotation angles that represent the transform between the body roll axis (as represented by the v-block support mechanisms 30) and the world coordinate frame. By including the rotation angles for the world to v-block transformation in the optimization solution the method provided by the embodiments herein alleviates any need to precisely align the v-block support mechanisms 30 with the calibration target 20 so long as the calibration target x-axis is leveled.

The measurement method utilizes rotation matrices to describe the transformation between a series of reference coordinate frames. Each of these rotation matrices is a direction cosine matrix (DCM) which can be represented by a combination of three Euler rotation angles about the three axes of a given coordinate frame.

Rotation from the world coordinate frame to the nominal orientation of the v-block support mechanisms 30 is given by the 3×3 rotation matrix $R_W^{VB\sim}$. Using this nominal rotation allows for the world coordinate frame and the v-block support mechanisms 30 to use axis conventions that are not aligned while allowing the optimization calculation to operate on relatively small rotation angles. Typical axis convention for the world coordinate frame is x-axis to the right, y-axis down, z-axis into the calibration target 20. Typical axis convention for the v-block support mechanisms 30 is x-axis parallel to the v-notch, y-axis to the right, z-axis down. This results in a situation where the z-axis of the world coordinate frame is nominally aligned with the s-axis of the v-block support mechanisms 30. Thus, the rotation matrix $R_W^{VB\sim}$ comprises of a series of 90° rotations resulting in the rotation matrix below:

$$R_W^{VB\sim} = \begin{bmatrix} 0 & 0 & 1 \\ 1 & 0 & 0 \\ 0 & 1 & 0 \end{bmatrix}$$

Rotation from the nominal orientation of the v-block support mechanisms 30 to the actual orientation of the v-block support mechanisms 30, accounting for misalignment between the calibration target 20 and the v-block support mechanisms 30 is given by the 3×3 rotation matrix $R_{VB\sim}^{VB}$. This rotation matrix is constructed from only the yaw and pitch Euler angle terms with the roll term set equal to 0. The calibration target 20 is leveled as part of the measurement procedure and the physical nature of the v-block support mechanisms 30 dictates that it does not impose any influence on the roll angle of the body 10. Accordingly, $R_{VB\sim}^{VB}=f(\varphi_{VB}, \theta_{VB})$, where the angles $\varphi_{VB}$, $\theta_{VB}$ are the Euler rotation angles between the nominal v-block coordinate frame and the actual v-block coordinate frame accounting for misalignment.

Rotation from the actual orientation of the v-block to the coordinate frame of the body is given by the 3×3 matrix $R_{VB}^{B}$. This matrix is composed of only the roll Euler angle term as rotating the body 10 on the v-block support mechanisms 30 produces a pure rolling motion. $R_{VB}^{B}=f(\phi_B)$, where the angle $\phi_B$ is the Euler roll angle of the body 10 on the v-block; support mechanisms 30 as measured by the center finding inclinometer or other means. The body roll angle is accurately referenced to the world coordinate frame because the leveled calibration target 20 and the center finding inclinometer use the Earth's gravity vector as a common reference. The measured sequence of roll angles for the captured series of images is an input to the optimization calculation.

Rotation from the body 10 to the nominal camera coordinate frame is given by the 3×3 rotation matrix $R_B^{C\sim}$. This rotation allows for the body 10 and imaging device 5 to use axis conventions that are not aligned while allowing the optimization calculation to operate on relatively small angles. Typical axis convention for the body is x-axis out the nose, y-axis out the right wing, z-axis down. Typical axis convention for the camera is x-axis to the right of the image, y-axis down, z-axis out the lens. This results in a situation where the x-axis of the body 10 is nominally aligned with the z-axis of the camera. Thus, the rotation matrix $R_B{}^{C\sim}$ comprises of a series of 90° rotations resulting in the rotation matrix below:

$$R_B^{C\sim} = \begin{bmatrix} 0 & 1 & 0 \\ 0 & 0 & 1 \\ 1 & 0 & 0 \end{bmatrix}$$

Rotation from the nominal camera coordinate frame to the actual camera coordinate frame is given by the 3×3 rotation matrix $R_{C\sim}{}^C$. This rotation matrix describes the misalignment between the camera projection axis (camera z-axis) and the body longitudinal axis (body x-axis) as well as the rotation of the image coordinate frame with respect to the body roll orientation (camera yaw, rotation about z-axis). $R_{C\sim}{}^C = f(\varphi_C, \theta_C, \phi_C)$, where the angles $\varphi_C, \theta_C, \phi_C$ are the Euler rotation angles between the nominal camera coordinate frame and the actual camera coordinate frame.

Figure 6:
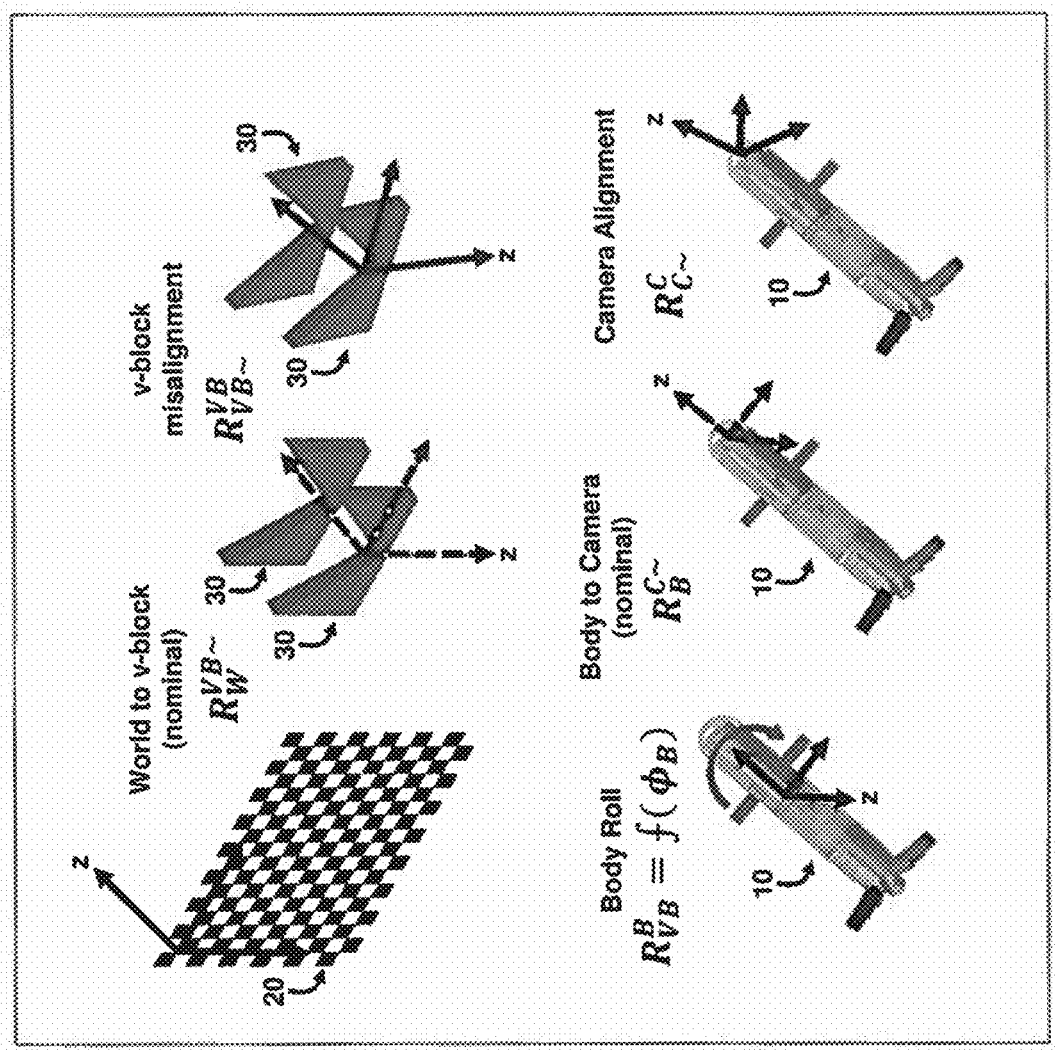
FIG. 6 is an illustrative example of performing a camera alignment process, according to an embodiment herein.

Multiplication of rotation matrices for intermediate coordinate frames allows for the rotation from the world coordinate frame to the actual camera coordinate frame as shown in FIG. 6. This series of rotations can be expressed as:

$$R_W{}^C = R_{C\sim}{}^C R_B{}^{C\sim} R_{VB}{}^B R_{W}{}^{VB-}$$

Using the above definitions for rotation matrices, the world to misaligned camera rotation transformation $R_W{}^C$ is a function of five unknown variables $\varphi_{VB}, \theta_{VB}, \varphi_C, \theta_C, \phi_C$, and one measured variable $\phi_B$ which is recorded at the time the series of images is captured.

The series of images captured at different body roll angles provides a dataset that may be used to perform a non-linear least squares numerical optimization to estimate the five unknowns. The numerical optimization requires the calculation of an error residual that can be minimized to arrive at an optimization solution. This error residual is calculated by comparing the rotation transformation $R_W{}^C = f(\varphi_C, \theta_C, \phi_C, \varphi_{VB}, \theta_{VB}, \phi_{VB})$ to the world to camera transformation provided by the extrinsics estimate for each captured image. This comparison results in a residual rotation matrix given by $R_{residual} = R_W{}^C R_W{}^{C-}$ where $R_W{}^{-C}$ is the transpose of the measured world to camera rotation matrix provided by the extrinsics estimate $R_{residual}$ is converted into three Euler angles, which form the error residual between the numerical optimization solution and the measured world to camera transformation from the extrinsics estimates for each image. The residual vector r is a column vector (of dimension three times number of images by one), and the least squares cost function becomes:

$$J(\varphi_C, \theta_C, \phi_C, \varphi_{VB}, \theta_{VB}, \varphi_B) = r'r$$

Once the numerical optimization has solved for an estimate of the nominal camera coordinate frame to actual camera coordinate frame rotation matrix $R_{C\sim}{}^C$ the camera to body rotation matrix needed to produce image based navigation states in the body coordinate frame $R_C{}^B$ may be generated using the following equations.

$$R_B{}^C = R_{C\sim}{}^C R_B{}^{C\sim}$$

$$R_C{}^B = (R_B{}^C)^{-1}$$

The procedure described above may be used to estimate the camera to body transformation for various imagers containing a lens mounted within a body 10.

Experimentally, the method described herein was demonstrated with an imager 5 mounted within an 83 mm cylindrical body 10, A camera intrinsics and distortion model for the imaging device 5 was previously calculated in MATLAB® software using a refined version of the camera calibration toolbox utilities available from the California Institute of Technology and a series of images of a checkerboard calibration target 20. The demonstration experiment used the same checkerboard calibration target used for estimation of the camera intrinsics. A pair of v-block support mechanisms 30 were used to capture a series of seventeen images of this calibration target over the sequence of body roll angles listed below:

[0,9.95,20.3,29.6,40.4,50.6,59.8,69.7,89.8,0,−10.6,−20.3,−30.3,−40.2,−50.2,−60,−70.7,−89.2,0.04]

MATLAB® Computer Vision System Toolbox was used to estimate the extrinsics for each image in the roll sequence. These extrinsics estimates and the roll values measured by a digital inclinometer were used as inputs to a non-linear least squares optimization to solve for the five variables $\varphi_{VB}, \theta_{VB}, \varphi_C, \theta_C, \phi_C$ using the MATLAB® software function lsqnonlin. Initial estimates for each unknown were set equal to 0°. The Jacobian (H) of the cost function returned by the MATLAB® software function was used to determine the estimation quality by forming an estimate of the Fisher information matrix:

$$F = H'H$$

The information matrix was full rank with a condition number of 5.41. This shows that the five parameters are identifiable from the data, although there is some cross correlation between the variables. To further evaluate the optimization accuracy, the information matrix was inverted to estimate the covariance of the estimated quantities, with the diagonal entries used to calculate the standard deviations. The optimization returned the results presented in Table 1 below:

TABLE 1

| Variable | Mean (degrees) | Standard Deviation (degrees) |
| --- | --- | --- |
| $\varphi_{VB}$ | −6.667 | 0.229 |
| $\theta_{VB}$ | −0.276 | 0.316 |
| $\varphi_C$ | −61.073 | 0.316 |
| $\theta_C$ | −0.176 | 0.316 |
| $\phi_C$ | −0.667 | 0.316 |

Mean residual for the optimization result was 0.034°, indicating that the rotation error between the optimization solution and the extrinsics estimate calculated for each image was small. Investigation into the Euler angle components of the residual error revealed that the mean error for the camera yaw axis was 0.057° while the mean error for the camera pitch and roll axes was 0.024° and 0.019°, respectively. The larger mean error value for the camera yaw axis may be attributed to the precision of the digital inclinometer that was used to measure the body roll angle for each image, which is limited to 0.1° precision for angles of magnitude greater than 10°. A more precise measurement could potentially further reduce the residual produced by the optimization solution. These results demonstrate the ability of the method provided by the embodiments herein to accurately measure the angles which characterize the imaging device to body rotation transformation (accuracy <0.1° camera yaw and <0.05° camera pitch and roll).

To demonstrate that the method provided by the embodiments herein is suitable for producing repeatable results, as well as suitable for differentiating between world to v-block misalignment and camera to body alignment, the process was repeated for three sets of images. For the first set, the calibration target 20 was placed approximately perpendicular to the z-axis of the imaging device 5. For the second set, the calibration target 20 was tilted by approximately 10° (measured by a digital inclinometer). For the third set, the calibration target 20 was panned by a few degrees (not measured). The result of the optimization calculation for these three image sets is provided in Table 2 below. A center finding inclinometer, which is precise to only 1°, was used to measure the body roll angle for this experiment, resulting in reduced accuracy in estimating the camera yaw angle when compared to the results presented above which used a digital inclinometer to measure the body roll angle. The results presented in the Table 2 demonstrate the ability of the method provided by the embodiments herein to produce repeatable results even if the body roll axis as constrained by the v-block support mechanisms 30 is misaligned with the calibration target 20.

TABLE 2

| | C~ to C Euler Angles (degrees) | | | VB~ to VB Euler Angles (degrees) | | Mean Residual |
|---|---|---|---|---|---|---|
| | Yaw | Pitch | Roll | Yaw | Pitch | (degrees) |
| Original Fit | −16.3022 | −0.3845 | −0.0346 | 1.9017 | 0.1454 | 0.2462 |
| Board Tilt | −15.8626 | −0.3854 | −0.0337 | 1.9293 | 10.522 | 0.1244 |
| Board Pan | −16.2485 | −0.3636 | −0.0438 | −3.4806 | 0.0179 | 0.2401 |

The method according to the embodiments herein provides a unique approach to measuring the camera to body rotational transform without the need for a precise physical configuration of the measurement hardware. Effective measurement may be accomplished with only a digital inclinometer to level the checkerboard calibration target 20 and a center finding inclinometer or digital inclinometer to measure the roll angle of the body 10. Because the method solves for misalignment between the calibration target 20 and the v-block support mechanisms 30 during numerical optimization, expensive mechanical or optical alignment devices are not necessary for effective implementation of the method provided by the embodiments herein.

Measurement results for a calibrated imager (e.g., imaging device 5) mounted within a body 10 demonstrate the ability of the method provided by the embodiments herein to generate repeatable measurements of the camera to body rotational transformation even if the checkerboard calibration target 20 and v-block support mechanisms 30 are misaligned.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code. In the software embodiments, instructions may be provided to a computing device 70 by the processor 55 linked to the computing device 70.

Figure 7:
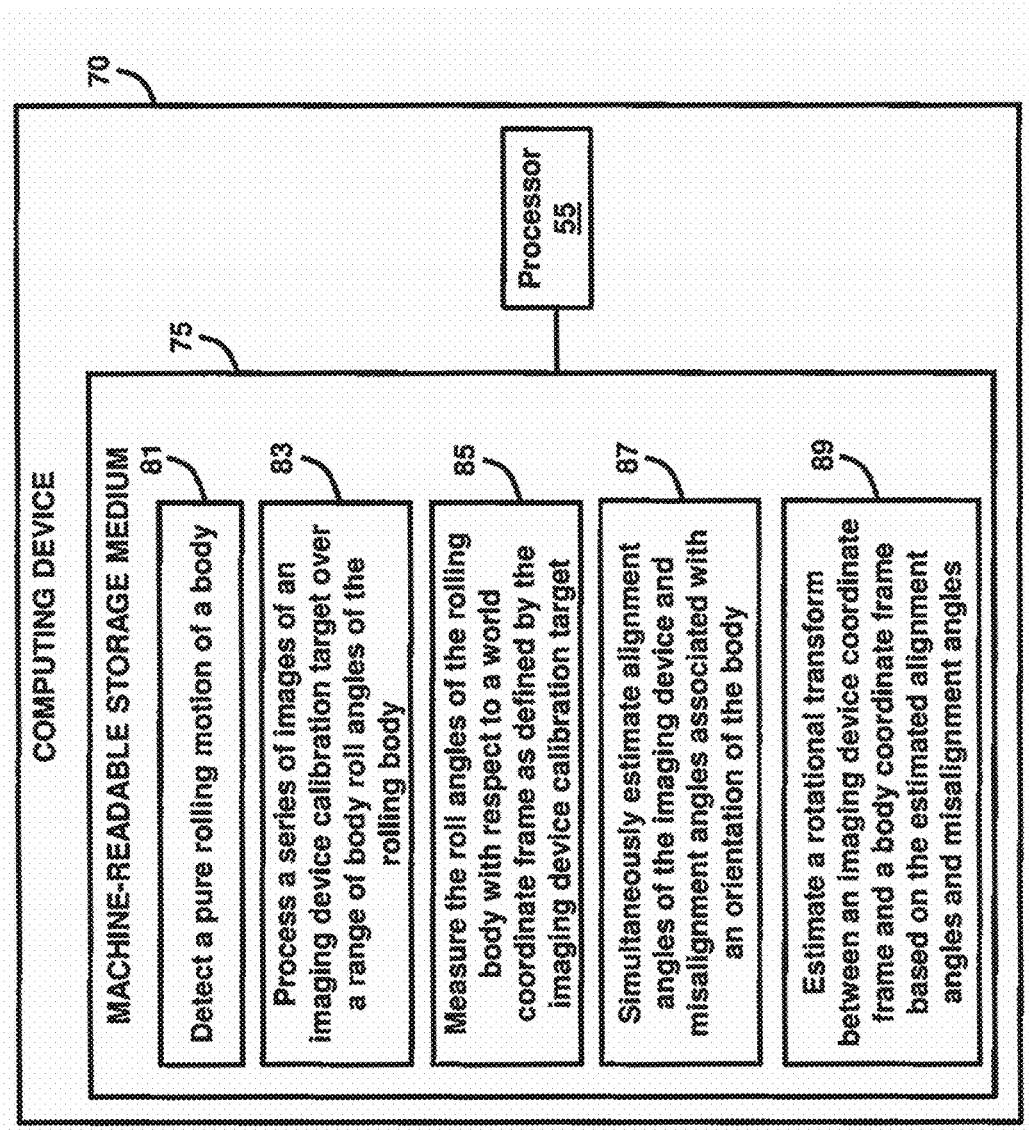
FIG. 7 is a block diagram of a computing device, according to an embodiment herein.

FIG. 7 with reference to FIGS. 1 through 6, is a block diagram of computing device 70 comprising the processor 55 as described above and a machine-readable storage medium 75. Processor 55 may include a central processing unit, microprocessors, and/or other hardware devices suitable for retrieval and execution of instructions stored in a machine-readable storage medium 75. Processor 55 may fetch, decode, and execute computer-executable instructions 81, 83, 85, 87, and 89 to enable execution of locally-hosted or remotely-hosted applications for controlling action of the computing device 70. As an alternative or in addition to retrieving and executing instructions, processor 55 may include one or more electronic circuits including a number of electronic components for performing the functionality of one or more of instructions 81, 83, 85, 87, and 89.

The machine-readable storage medium 75 may be any electronic, magnetic, optical, or other physical storage device that stores executable instructions. Thus, the machine-readable storage medium 75 may be, for example, Read-Only Memory, an Electrically-Erasable Programmable Read-Only Memory, a storage drive, an optical disc, and the like. In one example, the machine-readable storage medium 75 may include a non-transitory computer-readable storage medium.

In an example, the processor 55 executes computer readable instructions 81-89. For example, computer-executable detecting instructions 81 may detect a pure rolling motion of a body 10. Computer-executable processing instructions 83 may process a series of images 50 of an imaging device calibration target 20 over a range of body roll angles of the rolling body 10. For example, the images 50 are processed to estimate the extrinsics for each image. Computer-executable measuring instructions 85 may measure the roll angles of the rolling body 10 with respect to a world coordinate frame as defined by the imaging device calibration target 20. Computer-executable estimating instructions 87 may simultaneously estimate alignment angles $\varphi_C$, $\theta_C$, $\phi_C$ of the imaging device 5 and misalignment angles $\varphi_{VB}$, $\theta_{VB}$ associated with an orientation of the body 10. Computer-executable estimating instructions 89 may estimate a rotational transform between an imaging device coordinate frame and a body coordinate frame based on the estimated alignment angles $\varphi_C$, $\theta_C$, $\phi_C$ and misalignment angles $\varphi_{VB}$, $\theta_{VB}$.

The processor 55 is to use an imaging device extrinsics estimate to define a world-to-camera coordinate frame rotation for each image in the series of images 50. The processor 55 is to use a numerical optimization process to estimate the alignment angles $\varphi_C$, $\theta_C$, $\phi_C$ of the imaging device 5 and misalignment angles $\varphi_{VB}$, $\theta_{VB}$ associated with an orientation of the body 10.

According to the embodiments herein, v-block support mechanisms 30 may be used to produce pure rolling motion of a body 10. A series of images 50 of a checkerboard camera calibration target 20 is captured over a range of body roll angles. Numerical optimization may be used to estimate the rotational transform between the camera coordinate frame and the body coordinate frame and the misalignment between the v-block support mechanisms 30 and the calibration target 20. The embodiments herein avoid the requirement of directly measuring the orientation of the body 10 with respect to the calibration target 20 and accordingly does not require expensive mechanical or optical alignment devices.

The embodiments herein may be used to measure the alignment of a camera with the body 10 of a guided projectile, such as for use with a vision-based navigation system. In some embodiments, the system 100 may be used in the implementation of vision based navigation systems for robots, unmanned aerial vehicles (UAVs), self-driving cars, as well as photogrammetry applications such as aerial mapping.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for measuring an alignment of an imaging device, the method comprising:
   producing a pure rolling motion of a body;
   capturing a series of images of an imaging device calibration target over a range of body roll angles of the rolling body;
   measuring the roll angles of the rolling body with respect to a world coordinate frame as defined by the imaging device calibration target;
   simultaneously estimating alignment angles of the imaging device and misalignment angles associated with an orientation of the body; and
   estimating a rotational transform between an imaging device coordinate frame and a body coordinate frame based on the estimated alignment angles and misalignment angles
   wherein the producing of the pure rolling motion of the body occurs by a pair of support mechanisms that mechanically constrain the body to produce the pure rolling motion
   wherein the support mechanisms comprise v-block mechanisms.

2. The method of claim 1, wherein the body comprises a guided projectile.

3. A system for measuring an alignment of an imager, the system comprising:
   a pair of support mechanisms to produce a pure rolling motion of a body;
   an imager rigidly affixed to the body to capture a series of images of an imager calibration target over a range of body roll angles of the rolling body;
   a sensor to measure the roll angles of the rolling body with respect to a world coordinate frame as defined by the imager calibration target; and
   a processor to:
   simultaneously estimate alignment angles of the imager and misalignment angles associated with an orientation of the body; and
   estimate a rotational transform between an imager coordinate frame and a body coordinate frame based on the estimated alignment angles and misalignment angles, wherein the alignment angles comprise three rotation angles representing a transform between the body coordinate frame and the imager coordinate frame, and wherein the misalignment angles comprise two rotation angles representing a transform between a roll axis of the body and the world coordinate frame,
   wherein the body comprises a guided projectile containing the imager.

* * * * *